United States Patent [19]

de Goys de Mezeyrac et al.

[11] Patent Number: 4,985,482

[45] Date of Patent: Jan. 15, 1991

[54] COMPOSITION FOR GUMMING MINERAL FIBERS AND GUMMED MINERAL FIBERS

[75] Inventors: Charles de Goys de Mezeyrac, Gif-sur-Yvette; Roger Fugier, Rantigny; Bernard Giquel, St-Brice Sous Foret; Serge Tetard, Nogent Sur Oise, all of France

[73] Assignee: Isover Saint-Gobain, Courbevoie, France

[21] Appl. No.: 385,996

[22] Filed: Jul. 27, 1989

Related U.S. Application Data

[63] Continuation of Ser. No. 917,223, Oct. 9, 1986, abandoned.

[30] Foreign Application Priority Data

Oct. 9, 1985 [FR] France ................... 85-14943

[51] Int. Cl.$^5$ .................... C08L 61/28; C09D 161/28; C09J 161/28
[52] U.S. Cl. ................... 524/215; 524/423; 524/475; 524/541; 524/843
[58] Field of Search ................ 528/256; 524/843, 541, 524/215, 123, 475

[56] References Cited

U.S. PATENT DOCUMENTS

| | | | |
|---|---|---|---|
| 3,488,310 | 1/1970 | McCombs | 528/254 |
| 4,183,832 | 1/1980 | Meunier | 524/843 |
| 4,710,406 | 12/1987 | Fugier | 427/389.8 |
| 4,857,609 | 8/1989 | Flodman | 524/541 |

FOREIGN PATENT DOCUMENTS

| | | | |
|---|---|---|---|
| 211518 | 11/1956 | Australia | 528/256 |
| 0122836 | 10/1984 | European Pat. Off. | |
| 691053 | 5/1953 | United Kingdom | 528/256 |
| 872524 | 7/1961 | United Kingdom | 528/256 |

OTHER PUBLICATIONS

French Search Report FA 369 404, Jul. 18, 1986.

*Primary Examiner*—C. Warren Ivy
*Attorney, Agent, or Firm*—Oblon, Spivak, McClelland, Maier & Neustadt

[57] ABSTRACT

An aqueous resin composition usable in sizing compositions for the treatment of mineral fibers is disclosed. This aqueous composition comprises a resin obtained by the condensation, in a basic medium, of formaldehyde, urea, and melamine, in the presence of a polyol characterized by a functionality of at least 3. This resin is stable for long periods of times and capable of dilution by a factor of at least 100%.

14 Claims, No Drawings

COMPOSITION FOR GUMMING MINERAL FIBERS AND GUMMED MINERAL FIBERS

This application is a continuation of application Ser. No. 06/917,223, filed on Oct. 9, 1986, now abandoned.

BACKGROUND OF THE INVENTION

1. Field of the Invention

The present invention is concerned with the manufacture of insulation products based on mineral fibers.

2. Discussion of the Background

Insulating products based on mineral fibers are based on fibers obtained, for example, by centrifugal drawing. The fibers are joined together following a treatment which gives, among other things, the specific properties desired for the insulating products.

This treatment can be carried out in different ways. One can, for example, first assemble the fibers on a collector piece, such as a conveyor, compress them into a mattress, and then soak them in aqueous solutions containing thermoplastic resins or amino-plastics. Using this process water must be eliminated from the product by heat treatment. This leads to high energy costs.

Thus, preferably, one sprays the fibers the moment they are projected from the centrifuge with an aqueous solution based generally on phenoplastic resins, aminoplastics, or a mixture of the two In this process, the water is partially vaporized, and the last heat treatment serves essentially to reticulate the resins and to place the connected fibers in the form of a mattress.

An aqueous resin solution appropriate for use in a sizing composition must possess good stability as a function of time and must be highly tolerant of water. In this document, a sizing composition is understood as being an aqueous composition of a resin such as may be obtained from the condensation of starting materials from which a resin is obtainable as is well known in this art. Alternatively, a sizing composition is a composition to which has been added the usual sizing additives as well as, if needed, supplementary urea.

Solubility as used in this document is defined as follows. The solubility in water in the case of an aqueous resin solution is the volume of de-ionized water which can, at a given temperature, be added to a unit of volume of this solution before causing permanent trouble, e.g., the formation of a permanently heterogeneous system.

Aqueous solutions currently used, notably those based on aminoplastic resins, suffer from a water tolerance which can be insufficient in certain cases. Further, in the preparation of insulating shells, where the forming temperature is of the order of 80° C., the low solubility of these aqueous resin solutions (as shown by the fairly short jellying time for the sizing solution in which the aqueous resin composition is diluted) poses the risk of insufficient adherence for fibers impregnated with these solution. The binder is drier, and the later heat treatment leads to inhomogeneous polymerization. Fibers impregnated in this manner have their mechanical properties changed due to difficulties of using sizing compositions on an industrial line. It is thus clear that sizing compositions play an essential part in the final properties of the insulation product because they directly affect the mechanical characteristics of the product.

Compositions based on resins of the melamine-urea-formaldehyde type have been used in sizing compositions for mineral fibers. These compositions, prepared according to usual methods by the condensation of formaldehyde, urea and melamine in the presence of a catalyst, are however often unstable over time and/or as discussed above, possess solubility characteristics which are insufficient to assure good dispersion of the resin on the fibers.

This is why normal resin-based gums of this type cannot be applied onto heated mineral fibers, by spraying. The short jellying time of these solutions leads to the unequal application of the binder on the fibers. Only an application by soaking layers of mineral fibers in the sizing composition is satisfactory with aminoplastic resins to obtain satisfactory fiber sizing. This limitation restricts the possibilities of using fibers joined by a sizing solution containing known aminoplastics. Notably such behavior excludes pipes for thermal insulation destined to carry fluids carried at high temperatures, of the order of 400° C. In effect, for this type of application, compacting and molding of fibers is necessary to prepare tubular sheaths which correctly insulate the pipes. With napped fibers, it is not possible to carry out such compacting and molding operations.

There is thus a strongly felt need for an aqueous resin solution which can be used to prepare sizing compositions which do not possess the drawbacks found with currently existing aqueous resin solutions. Such an aqueous resin solution should possess good temporal stability. It should possess a high tolerance to water. And it should possess jelling time characteristics enabling it to satisfactorily impregnate mineral fibers at elevated temperatures.

SUMMARY OF THE INVENTION

Accordingly, it is an object of this invention to provide a novel aqueous resin composition usable in sizing compositions for the treatment of discontinuous mineral fibers. This aqueous resin composition possesses excellent temporal stability.

It is another object of this invention to provide such an aqueous resin composition which possesses high tolerance to water.

It is another object of this invention to provide such an aqueous resin composition possessing jelling time characteristics permitting an excellent impregnation of mineral fibers.

The present inventors have now surprisingly discovered an aqueous resin composition satisfying all of these objects of this invention, and others which will become obvious from a reading of the description of the invention given hereinbelow. This aqueous resin composition which is usable in sizing compositions for the treatment of discontinuous mineral fibers, comprises a resin obtained by condensation reaction in a basic medium. The condensation reaction comprises allowing formaldehyde, urea, and melamine to react in the presence of a polyol having a functionality equal to at least 3. This resin composition is characterized by the fact that it is stable as a function of time and soluble in water by a factor of at least 1000%.

DESCRIPTION OF THE PREFERRED EMBODIMENTS

The invention provides insulating products based on mineral fibers, giving good insulating behavior at high temperature, and usable particularly in the form of insulating felts, sheets for insulating pipework, and mattresses for producing molded products.

The present invention thus provides an aqueous solution based on a melamine-urea-formaldehyde resin. This resin, upon use, forms a sizing composition for mineral fibers, which is easy to use, particularly for spraying on mineral fibers.

It is known that stable melamine-urea-formaldehyde resins can be obtained by adding an alcohol to the initial composition. For example, European Patent Publication No. EP 0 000 884 discloses melamine-area-formaldehyde resins in which the resin is etherized by methanol in the presence of a strong acid. This makes the resin soluble and simultaneously blocks the condensation reaction, avoiding the deposit of methanolated products harmful to resin stability. This is an expensive method, and the length of final heat treatment to bake the resin after spraying the fibers is sharply increased as compared to usual baking times.

It has been equally proposed, for example in U.S. Pat. No. 3,488,310, to introduce a glycol in a composition based on a melamine-urea-formaldehyde resin. But this results in bad storage characteristics for the final product formed after heat treatment for fiber reticulation. These bad characteristics are evident from alterations in the mechanical properties of the product.

The present invention provides an aqueous solution based on an aminoplastic resin of the melamine-urea-formaldehyde type. This solution is highly water tolerant and stable over long periods of storage. It can be used in a sizing composition for mineral fibers. It will not cause the inconveniences outlined above either for the solution or as to the characteristics of the final product formed by the gummed fibers and heat treatment.

The invention provides a new aqueous resin composition based on a melamine-urea-formaldehyde resin destined to go into a sizing composition for discontinuous (short) mineral fibers. This composition permits obtaining sized fibers and finished insulation products. This composition provides products possessing all the desired mechanical characteristics. It also possesses a very high water tolerance, which in certain cases can be infinite. This composition is very stable in storage.

According to the invention, the aqueous solution comprises a resin product obtained by the condensation in a basic medium of formaldehyde, urea, melamine and a polyol having functionality at least equal to three. This aqueous solution is stable for storage and gives a dilutability at least equal to 1000%. In a preferred embodiment the polyol can be a trimethylol, the three methylol groups being carried by the same carbon, or a corresponding di-trimethyol.

According to a preferred embodiment of the present invention, the molar relationship (F)/(M) and (U)/(M), of the number of moles of formaldehyde (F) and urea (U) relative to the number of moles of melamine (M), follow the following relationships: (F)/(M)=0.5 (U)/(M)+1.5 to 3 (U)/(M)+3; and (U)/(M)=0.5 to 5.

The polyol used in the present invention can be of the type R—C—(CH$_2$OH)$_3$ which can be either in monomeric or dimeric form.

As a dimer, the polyol has the structure R—C(CH$_2$OH)$_2$-CH$_2$-O-CH$_2$-(CH$_2$OH)—C—R, where R is preferably a C$_{1-30}$ aliphatic hydrocarbon which may optionally be substituted with one or more hydroxyl groups. In a preferred embodiment of the invention, the alcohol used is chosen from pentaerythritol, dipentaerythritol, trimethylol propane, ditrimethylolpropane, or mixtures of these.

Preferably, to help the dissolution of the polyol, the reaction medium also contains an alkanolamine in very small quantities. One can, for example, use triethanolamine, diethanolamine, dimethylethanolamine, or mixtures of these.

The proportions of the different constituents of the aqueous solution can vary as a function of the final use of the treated fibers.

The polyol is used in a quantity sufficient to give the resin desired stability properties. These quantities must be less than those which prevent dissolution. The molar relationship of alcohol to melamine is between 0.2 and 2 moles roughly, preferably between about 0.25 and 0.5 moles of alcohol per mole of melamine.

It is not know exactly how the polyol reacts in the composition but its presence improves the mechanical properties of the final product which has been treated by a sizing composition containing this aqueous resin composition. The urea is present in an amount of 0.5 to 5 moles per mole of melamine, preferably 1.5 to 2.5 moles. The quantity of formaldehyde depends on the quantity of melamine and of urea introduced. Preferably, the reaction takes place with a quantity of formaldehyde, expressed in moles, between 1.4(U)+1.5(M) and 3(U)+3(M), where (U) signifies the number of moles of urea and (M) the number of moles of melamine. Finally, the base catalyst is used in an amount of about 0.01 to 0.1 mole per mole of melamine. Advantageously, the catalyst is introduced in two stages for better control of the reaction at the start. The first addition is to form the intermediate resin of formaldehyde and urea. At this stage it is necessary to avoid the formation of undesirable products. If need be, it is possible to introduce the catalyst, which is usually soda or any other basic catalyst well known in the art, only in the second stage of the heat cycle used leading to the production of the final resin. Adding the catalyst at the second stage provides a more controlled reaction at the start of the cycle.

It is equally possible to introduce a supplementary amount of formaldehyde, if needed, to increase the dilutability of the resin. In this case, one adds to the resin up to 3 moles of formaldehyde per mole of melamine. This supplementary formaldehyde can be introduced during a stage of preparation distinct from that where the first amount is introduced.

Alkanolamines are introduced in trace amounts, e.g., in amounts less than 0.01 mole per mole of melamine, enough to help the dissolution of polyol.

The aqueous solution following the invention can be stored for several weeks at ambient temperature. It possesses a high level of solubility in water, measured at ambient temperature. Its solubility is at least equal to 1000%.

The invention involves also a method of preparing the aqueous resin solution described above. According to this method, the resins are formed by following the sequential protocol outlined below:

(1) In the first phase of the process, an aqueous solution of formaldehyde is combined with the polyol at a temperature of from 35° C. to 45° C., preferably about 40° C. An alkanol amine is then added.

(2) One then adds the basic catalyst, generally soda.

(3) One adds urea to form an intermediate resin.

(4) The reaction mixture temperature is then raised to from 75° C. to 85° C., preferably about 80° C., and a second charge of basic catalyst is added, followed by melamine.

(5) The temperature of the reaction mixture is maintained at from 75° C. to 85° C., preferably about 80° C., to promote the condensation reaction with the melamine, at the same time maintaining a quasi infinite tolerance to water.

(6) The reaction mixture is then cooled to room temperature, 20° C. to 40° C., preferably about 30° C.

(7) If necessary, the pH of the mixture is then adjusted to a value of about 8.5 to 9.5, preferably about 9.

Following an advantageous characteristic of the invention, the conditions of preparing the aqueous solution of resin are as follows. The urea is added for about 30 minutes. The mixture is heated to about 80° C. in about 30 minutes. One then adds to this mixture, heated to 80° C., a basic catalyst over 10 minutes, then melamine over 30 minutes, and then keeping the mixture temperature at 80° C. for 90 minutes.

To obtain a better dilution of the aqueous resin composition obtained, in water, it is perhaps advisable to introduce after cooling additional formaldehyde in a quantity sufficient to obtain a solubility in water of at least 1000%. Following the desired solubility, one can add up to 3 moles of formaldehyde per mole of initial melamine.

The invention also covers the production of a sizing composition to be applied, for example, by spraying on mineral fibers, which can be the aqueous resin solution covered by the invention use alone or in a mixture with other ingredients.

It is known to use as a sizing composition for mineral fibers heat hardening phenolic resins. Such compositions are easily sprayed on the fibers because phenolic resins polymerize quickly at high temperatures without the appearance of undesirable phenomena prior to jellification. But it is also known that such use of sizing compositions of phenolic resins leads to products which do not give a good performance against heat. In an example, one notes that the heat behavior properties of final products have been improved notably by modifying the base phenolic resin with dicyandiamide.

Another aim of the invention is thus to obtain a new sizing composition consisting of an aqueous phenolic resin-based composition, which leads to the production of finished products giving a better heat performance.

Another aim of the invention is to obtain a sizing composition which has amongst its constituents an aqueous composition of aminoplastic resin prepared from melamine, urea and formaldehyde, following the invention and which sprays easily on fibers.

Another aim of the invention is to optimize the relative proportions of the melamine-urea-formaldehyde resin and the phenolic component to obtain optimal sizing composition jellifying time and product heat resistance.

With this in view, the invention provides a sizing composition destined to be applied by spraying, for example on mineral fibers, which contains (i) the aqueous resin composition described above, (ii) a normal aqueous phenolic resin of heat hardening type for use in a sizing composition, (iii) sufficient quantities of urea to capture free formaldehyde, and (iv) the usual sizing additives.

Advantageously, the sizing composition can consist of (expressed as dry material) from 30 to 60 parts of resin following the invention, 20 to 40 parts of supplementary urea, and 10 to 30 parts of heat hardening phenolic resin.

The invention also aims at an insulation product, particularly a shell for insulating pipework, which, when treated by the sizing composition previously defined, gives a good heat performance. The invention has also other aims. In the field of insulation products, the absence of coloring in the product is in high demand because of it suitability in varied applications.

Another aim of the invention is thus to supply white insulation products. One can cite for example insulating panels for ceilings. These consist of superimposing a panel of rolled sized mineral fibers, a cover of glass, and a simple coat of paint, giving the product a pleasing final effect. When the fiber panel is yellow, a thick coat of paint is necessary to give the ceiling panel a white color. In the case where the fiber panel is itself white, only a much thinner coat of paint is necessary.

To this end, the invention has as an aim a sizing composition which only consists of (i) a melamine-urea-formaldehyde resin described earlier with as an ingredient (ii) a polyol of the formula $R-C-(CH_2OH)_3$ or its in the dimeric form $R-C-(CH_2OH)_2-CH_2-O-CH_2-(CH_2OH)_2-C-R$, (iii) urea, and (iv) the usual sizing additives.

Preferably, the sizing composition consists of, for 100 parts of dry urea material and aqueous resin composition, 65 to 90 parts of aqueous resin solution and 10 to 35 parts of urea.

According to this variation, the products treated by the sizing composition possess equally good behavior to heat.

The invention also covers a method of making an insulating product based on discontinuous (short) mineral fibers in which the sizing composition is used, as well as the insulation product obtained by using the method.

Other features of the invention will become apparent in the course of the following description of exemplary embodiments which are given for illustration of the invention and are not intended to be limiting thereof.

The description below shows examples of preparing the aqueous resin composition, the sizing composition, and products of mineral fibers, all of which are part of the invention.

In a general manner, a typical sizing composition has the following additives relative to 100 parts of dry resin urea material:

(i) 0 to 5 parts of ammonium sulphate, preferably 1 to 3 parts.
(ii) 0 to 2 parts of silane.
(iii) 0 to 20 parts of oil, preferably 6 to 15 parts.
(iv) 0 to 20 parts of 20% ammonia, preferably 3 to 12 parts.

The role of these ingredients is known and is only briefly discussed here. Ammonium sulfate serves as a polycondensation catalyst (in the oven) after spraying the sizing composition onto fibers. Silane is a carrying agent between the fibers and the resin, and also plays an anti-ageing role. Oils are anti-dust agents and hydrophobes. Cool ammonia retards polymerization Urea modifies the composition and influences the pre-jellification of the sizing composition, and reduce pollution.

Some of the ingredients, other than resin, can be omitted to adapt the sizing composition to a special production line, or to obtain particular final properties. Also in the case where the sizing composition is applied to products requiring a good performance against fire, one uses a composition with little or no oil.

Among the examples described, examples 1,2,3 and 4 follow the invention. Comparative Example 1 is an example in which the polyol has been replaced by ethylene glycol. To establish a coherent base for comparison between the many examples, reference is made in each case to a similar number of alcohol functions; the number of moles of melamine nearly 2. For each example one notes the preparation of the aqueous resin composition, that of the sizing composition, and the formation of the final product.

To appreciate better the effects of the resin of this invention on the final products obtained, a comparison is established between certain characteristic properties of (1) a fiber mattress covered by a base sizing composition on the one hand, (2) an aqueous resin composition following the invention on the other, and (3) a phenol formalin resin such as is currently used in this type of application.

Comparisons with known products are always difficult to establish because of the many parameters contributing to the build up of these properties. One takes into account the thinness of fibers, the cost of gum in weight of final product, color, resistance to tension, resistance to tearing, and recovery of thickness after a given amount of compression.

One can also make a distinction in the case of density (expressed in kg m$^{-3}$) of the final products obtained. In all ranges of products which can be made from gummed fibers, one sees the problem of making shells which are stable at high temperatures, which must also have a satisfactory strength and cohesion, as well as being relatively dense. Examples 1 and 2 correspond to low density products which are compared to a low density product obtained with a normal resin. Example 3 follows the invention relative to a dense product. Example 5 describes a counter example relative to a dense product for which an ethyleneglycol resin has been introduced in the aqueous composition. The properties applicable to examples 3 and 4 will be compared with those of a dense product sized with a normal phenol formalin resin.

The parameters indicated have been determined from the following tests:

Micronaire Measurement

Traditionally, the fineness of fibers is appreciated globally by a measure called the micronaire, defined by ASTM Standard D 1448-78. The micronaire is determined as follows. A sample of product, normally 5 g is placed in a compartment through which a gaseous current is passed. The particularly pressure of the gas being well established. The sample forms an obstacle for the gaseous current and slows the passage of this gas. The gas flow is measured by a graduated gas flow meter. These are values defined for standardized conditions which are established. The finer the fibers for an equal weight of sample, the less strong the flow.

Measure of Resistance to Tension

The resistance to tension called "the rings" is measured in accordance with Standard ASTM-C-681-76. According to this standard, rings of well defined dimensions are punched in a mattress or sheet of fibers. The rings are placed on two cylindrical tension rods which are subjected to opposing forces. The force to rupture is measured. To obtain comparable results, the force used is related to the weight of the sample. The results are expressed in gf g$^{-1}$.

Measure of Thickness Recovery

Thickness recovery is measured according to DIN Standard 18165. Samples are subjected to compression to reduce their nominal thickness up to 75%, for a predetermined length of time. The thickness regained after compression is measurement without shaking the fibers. For this a cylindrical rod is used in which a disc slides, the rod is driven into the mattress and the disc presses onto the surface.

Measurement of Tearing Resistance

The measurement of tearing resistance is particularly significant for dense products, which, in the application which is their role, are often covered with paper or aluminium strips. To determine tearing resistance, one presses on a test piece of pre-established dimensions a flat surface made of a determined material which is glued on with a standard adhesive. One determines the force necessary to tear the flat surface. This measurement permits an evaluation of the cohesion of the fibers forming the test piece.

The results of these measurements are shown in Tables 2 and 3. For low density products the following data are shown in Table 2: the density (kg m$^{-3}$); the amount of size held by the fibers, expressed as a percentage of the total weight of gummed fibers, (amount of gum %); the micronaire (F/5g); the color; resistance to tearing expressed as gf g$^{-1}$ after manufacture, and after an ageing test in the autoclave where the product is subjected to the action of steam pressure at 107° C. (after auto.); and thickness recovery (compression to a quarter of the thickness for 24h and for 3 months). The data indicated, expressed as a percentage, allow a comparison of different examples.

For dense products (Table 3), density, the weight of gum, the micronaire and the color is indicated in the same way. Data on the resistance to tearing after manufacture expressed in Newtons, and the re-inflation observed after the ageing tests in the autoclave, expressed in millimeters (of re-inflation) are also provided.

A comparison of the properties of the products of the present invention against those obtained for products impregnated with a standard phenolic resin based sizing composition of heat hardening type is provided. Their standard phenol resins are obtained by condensation, in a basic medium of phenol, of formaldehyde and urea.

In Table 1 molar quantities of different ingredients used in the preparation of aqueous resin compositions are provided, as well as the molar relationships referred to one mole of melamine. For the formaldehyde and the catalyst, the supplementary quantities added at a different stage of the proceeding are shown in brackets.

EXAMPLE 1

(a) Preparation of An Aqueous Resin Composition 321.6 kg of an aqueous solution of formaldehyde at 37% (3962 moles of pure formaldehyde) are added to a 6 ton reactor. The pH is between 2.8 and 5. Over 1 minute, 0.5 kg of triethanolamine in the form of a solution of 85% purity (2.85 moles of pure triethanolamine) are added. This takes the pH to about 7.3. The mixture is then held at 40° C for 10 minutes.

The condensation catalyst is then added over a period of 5 minutes in the form of a solution of soda at 47% (0.65 kg or 7.6 moles of soda). This provides a pH of about 9.8. Without modifying the temperature, 95.2 kg of urea in solid form (1585 moles) are added over 30 minutes. In 30 minutes the temperature is raised to 80° C. As soon as this 80° C. temperature is reached, 2.35 kg of supplementary soda in a 47% solution (27.6 moles) are added over 10 minutes. 100kg of melamine in solid form (793 moles) are then added, and the mixture is held for 90 minutes at 80° C. to obtain the condensation of melamine and formaldehyde The reaction mixture is then cooled to 30° C. for 30minutes. 96.6 kg of formaldehyde in solution (1191 moles of pure formaldehyde) are then added over 10 minutes with cooling from 30° C to 25° C. Continuing the cooling operation, one introduces diluted sulphuric acid in sufficient quantity to reach a pH of about 9.2, or about 2 kg of a 15% solution of sulphuric acid.

The resin is stored at ambient temperature (about 18° C), preferably with stirring. After a month of storage, the resin has a solubility (measured at ambient temperature) of above 1000%, a white color and a dry consistency of the order of 50%.

(b) Preparation of a Gumming Composition

A sizing composition is prepared by adding to the aqueous resin composition previously prepared supplementary urea and sizing additives. The sizing additives used are silane and a mineral oil. One can cite for example a commercialized amino-silane from Union Carbide under the name of A 1100 ®, which is hydrolized by acid catalysis, in an aqueous solution of 20%. As a mineral oil one can use commercial oil by Mobil Oil under the name of Mulrex 91 ®.

The following ingredients are then combined (proportions expressed in weight of dry material): 70 parts of resin, 30 parts of urea and, for 100 parts weight of the composition supplementary resin and urea, 0.3% of silane and 6% of mineral oil.

(c) Forming the Finished Product

Mineral fibers produced by centrifugal drawing (as is known in this art) are sprayed with the sizing composition, between the outlet from the centrifuge device and the entry of the fibers on a receiver device. The water contained in the composition is partially vaporized because of the high temperature. After the fibers are collected and a mattress is formed, the fibers are submitted to a heat treatment in a oven at a temperature of 200° C. for about 2 minutes. This leads to polymerization of the resin. The fibrous product obtained has a white color. Its mechanical properties are comparable with those obtained from a standard phenolic resin, as that shown in Table 2.

EXAMPLE 2

(a) Preparation of An Aqueous Resin Composition

A 150 liter reactor equipped with a stirring system and other means to control temperature and vapor condensation is charged with 110kg of an aqueous formaldehyde solution of 37% (1355 moles of pure formaldehyde), then 22 kg of trimethylolpropane (164 moles). The 164moles of trimethylolpropane correspond to 492 alcohol functions, which implies a relationship of alcohol functions to the number of melamine moles of 1.8.

The reaction medium temperature is adjusted to 40° C. The pH is 4.9.

217 g of soda in a 50% aqueous solution (2.71 moles of pure soda) are added over 5 minutes to the reactor. This results in a pH of 9.7. The temperature is always maintained at about 40° C. 32.5 kg of urea (54 moles) are then added continuously over 30 minutes. The temperature is raised to 80° C. in 30minutes. 814 kg of soda in a 50% aqueous solution (10.2 moles of pure soda) are then added in a second stage. The pH is about 10.5. 34.2 kg of melamine (271 moles) are then added keeping the temperature around 80° C. This temperature is held for 4 hours from the introduction of the melamine, followed by cooling in 12 minutes to 25° C.

33 kg of formaldehyde at 37% (407 moles of pure formaldehyde) are then added over 12 minutes. The pH reaches about 9. Adjustment to this value can be made, if necessary, either with sulphuric acid or with soda.

The resin is stored at about 18° C. It is preferable to wait about 24 hours before it is used.

The resin is characterized by a dry state of 50%, a density of 1.23 g cm$^{-3}$ as measured at 16° C., and in infinite solubility after a month of storage.

(b) Preparation of a Gumming Composition

Proceeding as outlined in Example 1, but the following proportions of ingredients are used: 85parts of resin, 15 parts of urea, the proportions being expressed in weights of dry material, and for 100 parts of the resin and supplementary urea, 0.3% silane and 6% of mineral oil.

(c) Making a Finished Product

A mattress is formed following the protocol of Example 1 The product obtained also has a white color. Its mechanical properties are comparable with those of a normal sizing composition, like that shown in Table 2.

EXAMPLE 3

(a) Preparation of An Aqueous Resin Composition

The procedure used is to that outlined in Example 1a.

(b) Preparation of a Gumming Composition

One proceeds in the same way as in Example 1b, but in mixing 70 parts of resin, 30 parts of urea, 0.3 parts of silane and 1 part of sulphate of ammonia. The proportions are expressed as weights of dry material.

(c) Making the Finished Product

A more dense product prepared by compacting before heat treatment in the oven. This type of product, having a density of the order 80 kg m$^{-3}$, is useful for the preparation of shells. It also has the desired white color.

EXAMPLE 4

This example describes the preparation of an aqueous resin composition particularly good for its properties of stability and solubility, and above all for its reproductability.

The procedure is very near to that described in Example 1. Only the constituents of the composition are modified as follows. The reactor is initially charged with 321.6 kg of an aqueous solution of formaldehyde with the temperature held at about 40° C. 43.2 kg of pentaerythritol (317 moles) are then added. The molar relationship of alcohol to melamine is 0.4 instead of the 0.54 of in Example 1. Pentaerythritol is added over 15 minutes and the temperature is held at 40° C. for 10 minutes. 0.6 kg of soda are then added over 5 minutes keeping the temperature at 40° C. Without changing the temperature, 95.2 kg of urea are added in solid form over 30 minutes. When the intermediate resin is formed the temperature is increased up to 8-° ±1° C. over 35 minutes. As soon as a temperature of 80° C. is reached, 2.4 kg of soda are added over 10 minutes, keeping the temperature at 80° C. 100 kg of melamine are then added over 30 minutes, all the time keeping the temperature at 80° C ±1° C.

The temperature is maintained at 80° C. for 10 minutes. The ability of this material of being diluted in water is almost infinite. The reactor is cooled to 30° C. in 30 minutes. A further 96.5 kg of formaldehyde are added over 15 minutes. During this time the temperature is lowered to 25° C. The pH is adjusted to 9.2+0.2 with dilute sulphuric acid over 15 minutes, while cooling to storage temperature, i.e. 17.5° C. ±0.2°. The aqueous solution of resin obtained is a dry uncolored extract of 48.5%, it is stable after a month of storage and can be diluted by a factor greater than 1000%.

EXAMPLE 4a

Preparation of a Sizing Composition

With an aqueous resin solution prepared in accordance with Example 4, a sizing composition is prepared with the following ingredients, (amounts expressed in weights for 100 parts of dry extract): 50parts of resin as Example 4; 20 parts of a phenolic resin of the heat hardening type of normal variety in gumming compositions; and 30 parts of urea. Additionally, for 100 parts of dry extract, 0.3% in weight of silane and 0.5% in weight of sulphate of ammonia are added. The remainder is water.

To prepare 100 kg of sizing composition containing 18% of the the dry extract, 58.3 liters of water, 15 liters of aqueous melamine resin composition prepared in accordance with Example 4, 7.9 liters of a 50% solution of urea (8.97 kg of liquid urea), 10liters of aqueous phenolic resin composition having a dry extract of 38.5% (11.65 kg of liquid resin) and 2.7 liters of a 20% silane solution (2.69 kg of liquid silane) are combined.

To determine the properties of heat resistance of products on which such a sizing composition is sprayed, the exothermic enthalpy measures of degradation of the sizing to heat are determined.

One measures the differential enthalpy produced by the with a SETARAM DCS 111 ® apparatus, in which establishes a thermal gradient of 4° C. per minute, over a temperature range of 250° C. to 750° C.

For compression, one is referred to similar measures operated on a sizing composition based on a phenolic resin of normal type, and based on a phenolic resin modified by dicyanamide.

The results are expressed in calories per gram of dry organic material (excluding water and ash).

| | Ex. 4 in accordance with the invention | Sizing composition based on a phenol resin of the resol type and of urea | Gumming composition based on phenol resin modified by dicyandiamide |
|---|---|---|---|
| Δ H (Cal/g) | −2700 | −3600 | −3300 |

The differential enthalpy measured is weaker with the sizing composition of the invention. One of the aims of the invention, to obtain a sizing composition containing an aqueous phenolic resin composition which provides a final product having improved heat resistance, is thus effectively obtained. The better heat resistance is reproduced in the finished product.

EXAMPLE 5

This is another example, in which ethyleneglycol is introduced to the reaction mixture.

(a) Preparation of An Aqueous Resin Composition

The protocol of example 2 is followed using the following quantities of materials, and replacing trimethylolpropane with ethyleneglycol.
110 kg of a 37% formalin solution at the start of the cycle, and 33 kg at the end of the cycle.
32.6 kg of urea.
34.2 kg of melamine.
15.15 kg of ethyleneglycol (244 moles) which corresponds with 1.8 alcohol functions per mole of melamine, as in Example 2.
The same quantity of soda is added, in two distinct stages, as shown in Example 2.
The temperature is held at about 80° C. for 2 hours and 15 minutes.
The resin obtained is characterized by a dry extract of 49.2%, by an infinite solubilizing after a month of storage.

(b) Preparation of a Gumming Composition

The protocol of Example 2 is followed.

(c) Making the Final Product

Following the protocol described in the earlier examples, a fiber mattress which is much more dense is prepared. This type of product, having a density of the other order of 80 kg/m³ is particularly useful for the preparation of shells.

Table 2 shows the lowering of mechanical properties of the final product, particularly the resistance to tearing after manufacture. The aqueous resin solution used in sizing is thus inferior as compared to the present invention.

TABLE 1

| Example | Melamine M (moles) | Alcohol A (moles) | Functions of Alcohol (mole melam.) | Urea U (moles) | Formaldehyde F (moles) | Alkanol amine a (moles) | Catalyst C (moles) | A/M | U/M | F/M | a/M | C/M |
|---|---|---|---|---|---|---|---|---|---|---|---|---|
| 1 | 793 | 428.2 | 2.16 | 1585 | 3962 (+1191) | 2.85 | 7.6 (+27.6) | 0.54 | 2 | 5 (+1.5) | 0.0036 | 0.01 (+0.034) |
| 2 | 271 | 164 | 1.8 | 541 | 1355 (+407) | — | 2.71 (+10.2) | 0.6 | 2 | 5 (+1.5) | — | 0.01 (+0.037) |
| 3 | 271 | 164 | 1.8 | 541 | 1355 (+407) | — | 2.71 (+10.2) | 0.6 | 2 | 5 (+1.5) | — | 0.01 (+0.037) |
| 4 | 793 | 317 | | 1585 | 3962 (+1191) | — | 7.6 (+27.6) | 0.4 | 2 | 5 (+1.5) | — | 0.01 (+0.034) |
| 5 | 271 | 244 | 1.8 | 541 | 1355 | — | 2.71 | 0.9 | 2 | 5 | — | 0.01 |

TABLE 1-continued

| Example | Melamine M (moles) | Alcohol A (moles) | Functions of Alcohol (mole melam.) | Urea U (moles) | Formaldehyde F (moles) | Alkanol amine a (moles) | Catalyst C (moles) | A/M | U/M | F/M | a/M | C/M |
| --- | --- | --- | --- | --- | --- | --- | --- | --- | --- | --- | --- | --- |
| | | | | | (+407) | (+10.2) | | | | (+1.5) | | (+0.037) |

TABLE 2

| Gumming Composition Based On: | Density kg/m³ | Gumming weight % | Micronaire F/5 g | Color | Resistance to tension after fab. | Resistance to tension after auto. | Regaining of thickness after 24 h of compres. | Regaining of thickness after 3 months of compres. |
| --- | --- | --- | --- | --- | --- | --- | --- | --- |
| Standard phenolic resin | 8.4 | 5 | 2.6 | yellow | 153 gf/g | 85 gf/g | 128 | 118 |
| Example 1 | 8.4 | 5 | 2.6 | white | 140 | 76 | 126 | 119 |
| Example 2 | 8.4 | 5 | 2.6 | white | 147 | 67 | 125 | 117 |

TABLE 3

| Gumming Composition Based On: | Density kg/m³ | Gumming weight % | Micronaire F/5 g | Color | Resistance to tearing after manufacture | Reflotion mm |
| --- | --- | --- | --- | --- | --- | --- |
| Standard phenolic resin | 80 ± 5 | 4.5 | 4 | yellow | 50 ± 5 | 5 |
| Example 3 | 87 ± 5 | 6 | 4 | white | 60 ± 5 | 2.5 |
| Example 5 | 87 ± 5 | 5.2 | 4 | white | 29 ± 5 | 10 |

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the U.S. is:

1. A method for preparing an aqueous resin composition usable in a sizing composition for the treatment of mineral fibers wherein the resin composition comprises a resin obtained from the condensation, in an aqueous basic medium, of formaldehyde (F), urea (U), and melamine (M), in the presence of a polymethylol compound having a functionality of at least equal to 3, wherein said resin has a water tolerance of at least 1000% at room temperature; said method comprising:
   (i) combining an aqueous solution of said formaldehyde with the polymethylol compound at a temperature of about 35° C. to 45° C.;
   (ii) adding a basic catalyst to the mixture obtained in step (ii);
   (iii) adding urea to form an intermediate resin;
   (iv) heating the reaction mixture to a temperature of from about 75° C. to 85° C.;
   (v) adding an additional amount of a basic catalyst;
   (vi) adding the melamine;
   (vii) maintaining a temperature of from about 75° C. for a length of time sufficient to permit a condensation reaction with the melamine while maintaining a high solubility in water; and
   (viii) cooling the reaction mixture,
   wherein:
   the molar ration (F/M) of the number of moles of formaldehyde relative to the number of moles of melamine is between:

$$\left(0.5\frac{U}{M} + 1.5\right) \text{ and } \left(3\frac{U}{M} + 3\right); \text{ and}$$

the molar ration U/M of the number of moles of urea relative to the number of moles of melamine is between 0.5 and 5; and
   the amount of polymethylol compound is between 0.2 and 2 moles per mole of melamine.

2. The method of claim 1, comprising using soda as the said catalyst.

3. The method of claim 1, comprising using a temperature of about 40° C. in step (i) and a temperature of about 80° C. in steps (v) and (viii).

4. The method of claim 1, comprising adjusting the pH of the solution obtained in step (ix) to about 9.

5. The method of claim 1, comprising:
   adding the urea added in step (iv) over a period of about 25 to 35 minutes;
   heating the reaction mixture in step (v) to a temperature of from 75° C. to 85° C. in about 30 minutes;
   adding the basic catalyst in step (v) over a period of about 10 minutes;
   adding the melamine added in step (vii) over a period of time of from 25 to 35 minutes;
   maintaining a temperature of from about 75° C. to 85° C. in step (vii) for a period of time of from 80 to 100 minutes.

6. The method of claim 1, wherein after cooling in step (ix) additional formaldehyde, in the form of an aqueous solution, is added to obtain an aqueous resin composition having a water tolerance of at least 1000% at room temperature.

7. The method of claim 6, comprising adding up to 3 moles of additional formaldehyde, wherein the moles of additional formaldehyde are measured relative to each mole of melamine.

8. A method for preparing an aqueous resin composition usable in sizing compositions for the treatment of mineral fibers, wherein the composition comprises resin obtained from the condensation, in an aqueous basic medium of formaldehyde (F) urea (U), and melamine (M), in the presence of a polymethylol compound having a functionality of at least equal to 3, wherein said resin has a water tolerance of at least 1000% at room temperature; said method comprising:
  (i) combining an aqueous solution of said formaldehyde with the polymethylol compound at a temperature of about 35° C. to 40° C.;
  (ii) adding an alkanol amine to the mixture obtained in step (i) to help the dissolution of the polymethylol compound;
  (iii) adding urea to form an intermediate resin;
  (iv) heating the reaction mixture to a temperature of from about 75° C. to 85° C.;
  (v) adding a basic catalyst;
  (vi) adding melamine;
  (vii) maintaining a temperature of from about 75° C. to 85° C. for a length of time sufficient to permit a condensation reaction with the melamine, while maintaining a high tolerance to water; and
  (viii) cooling the reaction mixture,
wherein:
  the molar ratio (F/M) of the number of moles of formaldehyde relative to the number of moles of melamine is between:

$$\left(0.5\frac{U}{M} + 1.5\right) \text{ and } \left(3\frac{U}{M} + 3\right); \text{ and}$$

the molar ration U/M of the number of moles of urea relative to the number of moles of melamine is between 0.5 and 5; and
  the amount of polymethylol compound is between 0.2 and 2 moles per mole of melamine.

9. A sizing composition for the sizing of mineral fibers destined to be used at high temperatures, comprising an aqueous resin composition obtained by the condensation, in an aqueous basic medium, of formaldehyde (F), urea (U), and melamine (M), in the presence of a polymethylol compound having a functionality of at least 3, said resin having a water tolerance of at least 1000% at room temperature, and comprising additional urea, an aqueous solution of a phenolic resin of the usual resol type, and at least one sizing agent chosen from the group consisting of ammonium sulfate, aminosilane, mineral oil, and ammonia,
wherein:
  the molar ratio (F/M) of the number of moles of formaldehyde relative to the number of moles of melamine is between:

$$\left(0.5\frac{U}{M} + 1.5\right) \text{ and } \left(3\frac{U}{M} + 3\right); \text{ and}$$

the molar ration U/M of the number of moles of urea relative to the number of moles of melamine is between 0.5 and 5; and
  the amount of polymethylol compound is between 0.2 and 2 moles per mole of melamine.

10. The sizing composition of claim 9, comprising, per 100 parts of dry matter, from 30 to 60 part of the said resin, on a dry matter basis, from 20 to 40 parts of additional urea, on a dry matter basis, and 10 to 30 parts, on a dry matter basis, of an aqueous phenolic resin composition of the normal resol type, wherein the balance of the composition comprises water and at least one sizing additive selected from the group consisting of ammonium sulfate (0 to 5 parts per 100 parts of dry resin urea material), aminosilane (0 to 2 parts per 100 parts of dry resin urea material) and 20% ammonia (0 to 20 parts per 100 parts of dry resin urea material).

11. A sizing composition for mineral fibers, comprising an aqueous resin composition obtained by the condensation, in basic medium, of formaldehyde (F), urea (U), and melamine (M) in the presence of a polymethylol compound having a functionality of at least 3, said resin having a water tolerance of at least 1000% at room temperature, wherein:
  the molar ratio (F/M) of the number of moles of formaldehyde relative to the number of moles of melamine is between:

$$\left(0.5\frac{U}{M} + 1.5\right) \text{ and } \left(3\frac{U}{M} + 3\right); \text{ and}$$

the molar ration U/M of the number of moles of urea relative to the number of moles of melamine is between 0.5 and 5; and
  the amount of polymethylol compound is between 0.2 and 2 moles per mole of melamine,
  said composition containing additional urea and at least one sizing additive selected from the group consisting of ammonium sulfate, aminosilane, mineral oil and ammonia.

12. The sizing composition of claim 11, said composition comprising for every 100 parts of dry matter, from 65 to 90 parts, on a dry matter basis, of the aqueous resin composition, from 10 to 35 parts, on a dry matter basis, of the said supplementary urea, wherein the balance of the composition comprises water and at least one sizing additive selected from the group consisting of ammonium sulfate (0 to 5 parts per 100 parts of dry resin urea material), aminosilane (0 to 2 parts per 100 parts of dry resin urea material), mineral oil (0 to 2 parts per 100 parts of dry resin urea material) and 20% ammonia (0 to 20 parts per 100 parts of dry resin urea material).

13. The sizing composition of claim 12, said composition comprising, per 100 parts of dry matter, about 70 parts of resin and about 30 parts of urea, and, for 100 parts of dry resin and urea material, about 0.8 part of aminosilane and about 6 parts of mineral oil.

14. An aqueous resin composition useful in a sizing composition for the treatment of discontinuous mineral fibers, wherein said resin composition comprises a resin obtained by the condensation, in an aqueous basic medium, of formaldehyde (F), urea (U) and melamine (M) in the presence of a polymethylol compound having a functionality of at least 3 and having the general formulae: R—(CH$_2$OH)$_3$ or R—C(CH$_2$OH)$_2$—CH$_2$—O—CH$_2$—C(CH$_2$OH)$_2$—R wherein R is an aliphatic hydrocarbon radical or an aliphatic hydrocarbon radical substituted by an hydroxyl group;
wherein:
  the molar ratio (F/M) of the number of moles of formaldehyde relative to the number of moles of melamine is between:

$$\left(0.5\frac{U}{M} + 1.5\right) \text{ and } \left(3\frac{U}{M} + 3\right);$$

the molar ratio U/M of the number of moles of urea relative to the number of moles of melamine is between 0.5 and 5; and the the amount of polymethylol compound is between 0.2 and 2 moles per mole of melamine;
the resin having a water tolerance of at least 1000% at room temperature;
and wherein said condensation is run in the presence of an alkanolamine selected from the group consisting of triethanolamine, diethanolamine, and mixtures thereof.

* * * * *